United States Patent
Li

(10) Patent No.: US 9,141,634 B2
(45) Date of Patent: Sep. 22, 2015

(54) METHOD FOR AUTOMATIC DATA REPLICATION AND TERMINAL

(71) Applicant: Huawei Technologies Co., Ltd., Shenzhen, Guangdong (CN)

(72) Inventor: Dongyuan Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/674,411

(22) Filed: Nov. 12, 2012

(65) Prior Publication Data

US 2013/0191334 A1 Jul. 25, 2013

Related U.S. Application Data

(63) Continuation of application No. PCT/CN2012/079044, filed on Jul. 23, 2012.

(30) Foreign Application Priority Data

Jan. 21, 2012 (CN) .......................... 2012 1 0019765

(51) Int. Cl.
*G06F 7/00* (2006.01)
*G06F 17/30* (2006.01)

(52) U.S. Cl.
CPC .... *G06F 17/30174* (2013.01); *G06F 17/30575* (2013.01)

(58) Field of Classification Search
CPC ................................................ G06F 17/30575
See application file for complete search history.

(56) References Cited

U.S. PATENT DOCUMENTS

| | | | |
|---|---|---|---|
| 8,572,038 B2 * | 10/2013 | Erofeev ........................ | 707/634 |
| 2003/0033327 A1 * | 2/2003 | Mandal et al. ................ | 707/204 |
| 2003/0084017 A1 * | 5/2003 | Ordille .............................. | 707/1 |
| 2004/0172423 A1 * | 9/2004 | Kaasten et al. ............... | 707/201 |
| 2005/0131902 A1 | 6/2005 | Saika | |

(Continued)

FOREIGN PATENT DOCUMENTS

| | | |
|---|---|---|
| CN | 1436413 A | 8/2003 |
| CN | 101099151 A | 1/2008 |

(Continued)

OTHER PUBLICATIONS

International Search Report and Written Opinion in corresponding International Patent Application No. PCT/CN2012/079044 (Oct. 25, 2012).

(Continued)

*Primary Examiner* — Loan T Nguyen
(74) *Attorney, Agent, or Firm* — Leydig, Voit & Mayer, Ltd.

(57) ABSTRACT

Embodiments of the present invention provide a method for automatic data replication and a terminal. The method includes: after a data link to a peer end is established, send to the peer end a search request used for searching for a second folder whose folder name is the same as that of a first folder, where the search request includes a folder name of the first folder; when the peer end determines that the peer end includes the second folder, receiving attribute information of each piece of second data in the second folder, where the attribute information of each piece of second data is sent by the peer end; when the attribute information of the second data is inconsistent with attribute information of first data in the first folder, sending a replication request to the peer end.

14 Claims, 5 Drawing Sheets

(56) References Cited

U.S. PATENT DOCUMENTS

| | | |
|---|---|---|
| 2006/0271602 A1* | 11/2006 | Davis et al. ............ 707/201 |
| 2008/0098034 A1 | 4/2008 | Van Den Brink et al. |
| 2008/0168183 A1 | 7/2008 | Marcy et al. |
| 2009/0193107 A1 | 7/2009 | Srinivasan et al. |
| 2010/0138385 A1 | 6/2010 | Palermiti et al. |
| 2010/0262582 A1 | 10/2010 | Garcia-Ascanio et al. |
| 2011/0238621 A1 | 9/2011 | Agrawal |
| 2012/0130949 A1* | 5/2012 | Picken et al. ............ 707/626 |

FOREIGN PATENT DOCUMENTS

| | | |
|---|---|---|
| CN | 101907977 A | 12/2010 |
| CN | 102117215 A | 7/2011 |
| CN | 102314476 A | 1/2012 |

OTHER PUBLICATIONS $1^{st}$ Office Action in corresponding Chinese Patent Application No. 201210019765.0 (Apr. 12, 2013).

* cited by examiner

METHOD FOR AUTOMATIC DATA REPLICATION AND TERMINAL

CROSS-REFERENCE TO RELATED APPLICATIONS

This application is a continuation of International Patent Application No. PCT/CN2012/079044, filed on Jul. 23, 2012, which claims priority to Chinese Patent Application No. 201210019765.0, filed on Jan. 21, 2012, both of which are hereby incorporated by reference in their entireties.

FIELD OF THE INVENTION

The embodiments of the present invention relate to the communications technologies, and in particular, to a method for automatic data replication and a terminal.

BACKGROUND OF THE INVENTION

Nowadays a user owns multiple terminals such as a desktop computer, a notebook computer, a mobile phone, and an iPad, and the user often needs to replicate some data such as music and a document from a desktop computer to a mobile phone or an iPad, or replicate some data such as a photo and a video from a mobile phone to a desktop computer.

However, a data cable is usually required to connect two terminals during conventional replication between terminals, and then a user manually replicates or moves a required file to another terminal. Therefore, data replication between two or more terminals is very time-consuming for the user.

For this reason, a kind of storage that data of all users is stored in a network and a user downloads data when necessary, for example, cloud storage, further emerges in the prior art. However, it is very troublesome for the user to search for a required file. However, cloud storage not only requires the support of a wide area network but also produces a communication traffic fee and a service fee for cloud management, so that it is quite inconvenient for a user to use.

Therefore, how to implement automatic data replication between two or more terminals becomes a technical problem that needs to be solved currently.

SUMMARY OF THE INVENTION

Embodiments of the present invention provide a method for automatic data replication and a terminal, so as to implement automatic data replication between two or more terminals, thereby greatly saving data replication time and facilitating an operation of a user.

The present invention provides a method for automatic data replication, where the method includes:

after a data link to a peer end is established, sending to the peer end a search request used for searching for a second folder whose folder name is the same as that of a first folder, where the search request includes a folder name of the first folder;

when the peer end determines that the peer end includes the second folder, receiving attribute information of each piece of second data in the second folder, where the attribute information of each piece of second data is sent by the peer end;

when the attribute information of the second data is inconsistent with attribute information of first data in the first folder, sending a replication request to the peer end, where the replication request includes attribute information that is in the second data and is inconsistent with the attribute information of the first data; and receiving second data that corresponds to the attribute information in the replication request and is sent by the peer end.

The present invention further provides a method for automatic data replication, where the method includes:

after a data link to a peer end is established, receiving a search request that is used for searching for a second folder whose folder name is the same as that of a first folder of the peer end and is sent by the peer end, where the search request includes a folder name of the first folder;

when it is determined, according to the search request, that the second folder is included, sending to the peer end attribute information of each piece of second data in the second folder;

receiving a replication request that is sent by the peer end when it is determined that the attribute information of the second data is inconsistent with attribute information of first data in the first folder, where the replication request includes attribute information that is in the second data and is inconsistent with the attribute information of the first data; and sending to the peer end second data that corresponds to the attribute information in the replication request.

The present invention further provides a terminal, including:

a first sending unit, configured to, after a data link to another terminal is established, send to the another terminal a search request used for searching for a second folder whose folder name is the same as that of a first folder, where the search request includes a folder name of the first folder; and a first receiving unit, configured to, when the another terminal determines that the another terminal includes the second folder, receive attribute information of each piece of second data in the second folder, where the attribute information of each piece of second data is sent by the another terminal; where the first sending unit is further configured to, when the attribute information of the second data is inconsistent with attribute information of first data in the first folder, send a replication request to the another terminal, where the replication request includes attribute information that is in the second data and is inconsistent with the attribute information of the first data; and the first receiving unit is further configured to receive second data that corresponds to the attribute information in the replication request and is sent by the another terminal.

The present invention further provides a terminal, including:

a second receiving unit, configured to, after a data link to another terminal is established, receive a search request that is used for searching for a second folder whose folder name is the same as that of a first folder of the another terminal and is sent by the another terminal, where the search request includes a folder name of the first folder; and a second sending unit, configured to, when it is determined, according to the search request, that the second folder is included, send to the another terminal attribute information of each piece of second data in the second folder; where the second receiving unit is further configured to receive a replication request that is sent by the another terminal when it is determined that the attribute information of the second data is inconsistent with attribute information of first data in the first folder, where the replication request includes attribute information that is in the second data and is inconsistent with the attribute information of the first data; and the second sending unit is further configured to send to the another terminal second data that corresponds to the attribute information in the replication request.

It can be seen from the foregoing technical solutions that, with the method for automatic data replication and the terminal in the embodiments of the present invention, after a data link to a peer end is established, a search request is sent to the peer end, and then when finding a second folder in the peer end according to the search request, the peer end sends attribute information of each piece of second data in the second folder to a local end, so that when it is determined that attribute information of the first data in a first folder is inconsistent with the attribute information of the second data, the local end sends a replication request so as to replicate the second data that is not included in the first folder to the first folder, thereby implementing automatic data replication between two or more terminals, greatly saving data replication time for a user, and at the same time, providing convenience for the user.

BRIEF DESCRIPTION OF THE DRAWINGS

To illustrate the technical solutions in the present invention more clearly, the accompanying drawings required for describing the embodiments are introduced briefly in the following. Apparently, the accompanying drawings in the following description merely show some embodiments of the present invention, and persons of ordinary skill in the art may also derive other drawings from these accompanying drawings without creative efforts.

DETAILED DESCRIPTION OF THE EMBODIMENTS

To make the objectives, technical solutions, and advantages of the present invention more comprehensible, the technical solutions in the present invention are clearly and completely in the following with reference to the accompanying drawings in the embodiments of the present invention. Apparently, the embodiments in the following description are merely a part of the embodiments of the present invention. Based on the following embodiments of the present invention, persons of ordinary skill in the art may still obtain other embodiments used to solve a technical problem of the present invention and achieve a technical effect of the present invention by making equivalent changes to some or all technical features without any creative effort, where these embodiments obtained by making equivalent changes apparently do not depart from the scope disclosed by the present invention.

Figure 1A:
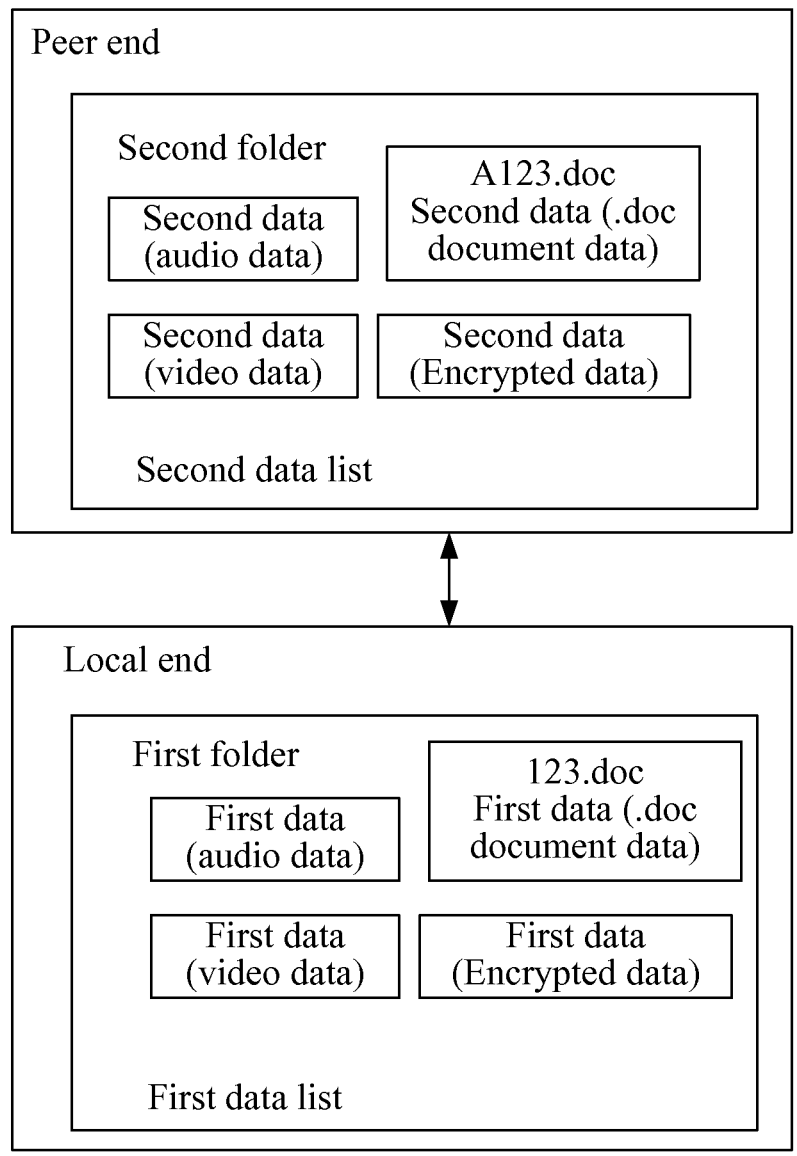
FIG. 1A is a schematic structural diagram of a process of data replication according to an embodiment of the present invention.
Figure 1B:
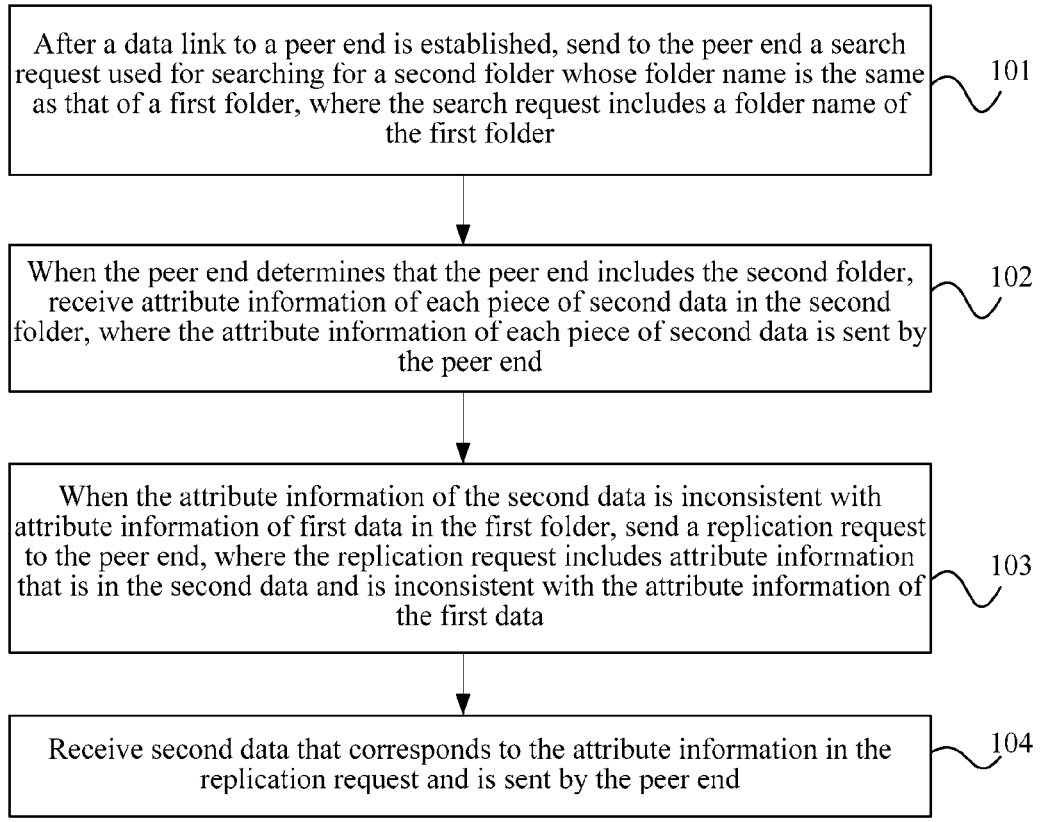
FIG. 1B is a schematic flow chart of a method for automatic data replication according to an embodiment of the present invention.

FIG. 1A is a schematic structural diagram of a process of data replication according to an embodiment of the present invention. FIG. 1B is a schematic flow chart of a method for automatic data replication according to an embodiment of the present invention. Referring to FIG. 1A and FIG. 1B in combination, FIG. 1A shows content included in a local end and content included in a peer end. The method for automatic data replication in this embodiment is described as follows.

101. After a data link to a peer end is established, send to the peer end a search request used for searching for a second folder whose folder name is the same as that of a first folder, where the search request includes a folder name of the first folder.

For example, both the local end and the peer end may be mobile phones, IPADs, desktop computers, or notebook computers, and so on. In this step, the first folder is located in the local end, and the first folder may include a video, an ebook, and music data, and may also be data content such as a video folder, a document folder, or a music folder. Correspondingly, the second folder may also include data content such as various codes, videos, documents, ebooks, music data, video folders, and programs. The data content included in the first folder and the second folder is not limited in this embodiment.

102. When the peer end determines that the peer end includes the second folder, receive attribute information of each piece of second data in the second folder, where the attribute information of each piece of second data is sent by the peer end.

In a practical application, if the peer end determines that the second folder does not exists in the peer end, the peer end sends prompt information to the local end, for example, to prompt that the second folder with the same folder name does not exist in the peer end.

103. When the attribute information of the second data is inconsistent with attribute information of first data in the first folder, send a replication request to the peer end, where the replication request includes attribute information that is in the second data and is inconsistent with the attribute information of the first data.

Generally, attribute information of any piece of data in each folder is recorded in its data list. For example, the data attribute of the first data may be recorded in a first data list, and the first data list is located in the first folder; and the attribute information of the second data may be recorded in a second data list, and the second data list is located in the second folder.

That is to say, the local end may receive a second data list in which the attribute information of each piece of second data is recorded, where the second data list is in the second folder and is sent by the peer end, and check whether the attribute information of each piece of second data in the second data list is consistent with attribute information of each piece of first data in a first data list.

For example, the local end may check whether any one item of the following: the name, size, modification time, and attribute of the second data is the same as a corresponding item of the following: the name, size, modification time, and attribute of the first data in the first folder. For example, As shown in FIG. 1A, the name of a document 123.doc in the first folder is "123", whereas the name of a document A123.doc in the second folder is "A123", and during a check of the local end, it is determined that the first folder does not have a name as the same as "A123", and at this time, it is determined that the name "A123" of the second data is inconsistent with the name "123" of the first data.

In other embodiments, other attributes of the first data and the second data may be further compared, which are not limited in this embodiment.

Particularly, the first data list and the second data list may be hidden files and replication is not performed between each other, and attribute information of data recorded in them may be sorted according to modification time or sorted according to names.

104. Receive second data that corresponds to the attribute information in the replication request and is sent by the peer end.

In this embodiment, the first data and the second data may be documents, audios, videos or photos.

That is to say, the peer end replicates second data that is included in the second folder and does not exist in the first folder to the first folder of the local end through a data link.

It should be understood that, in this embodiment, when attribute information of all first data in the first folder is identical to attribute information of all second data in the second folder, data replication is no longer performed.

For example, when the attribute information of the second data further includes a replication permission level, the replication request sent to the peer end further includes a preset key that corresponds to the replication permission level; and then when determining that the key is correct, the peer end receives the second data that corresponds to the attribute information in the replication request and is sent by the peer end.

In a practical using process, modification time of the first data may be checked regularly (such as one month or ten days). When the modification time satisfies a preset condition, first data corresponding to the modification time that satisfies the preset condition is deleted.

Further, according to the size of a preset storage space, the first data may also be periodically backed up to the storage space.

It can be seen from the foregoing embodiment that, with the method for automatic data replication in this embodiment, after a data link to a peer end is established, a search request is sent to the peer end, and then when finding a second folder in the peer end according to the search request, the peer end receives attribute information of second data in the second folder, so that when it is determined that attribute information of first data in a first folder is inconsistent with the attribute information of the second data, a replication request that is for replication and includes attribute information that is in the second data and is inconsistent with the attribute information of the first data is sent, thereby implementing automatic data replication between two or more terminals, greatly saving data replication time for a user, and at the same time, providing convenience for the user.

Figure 2:
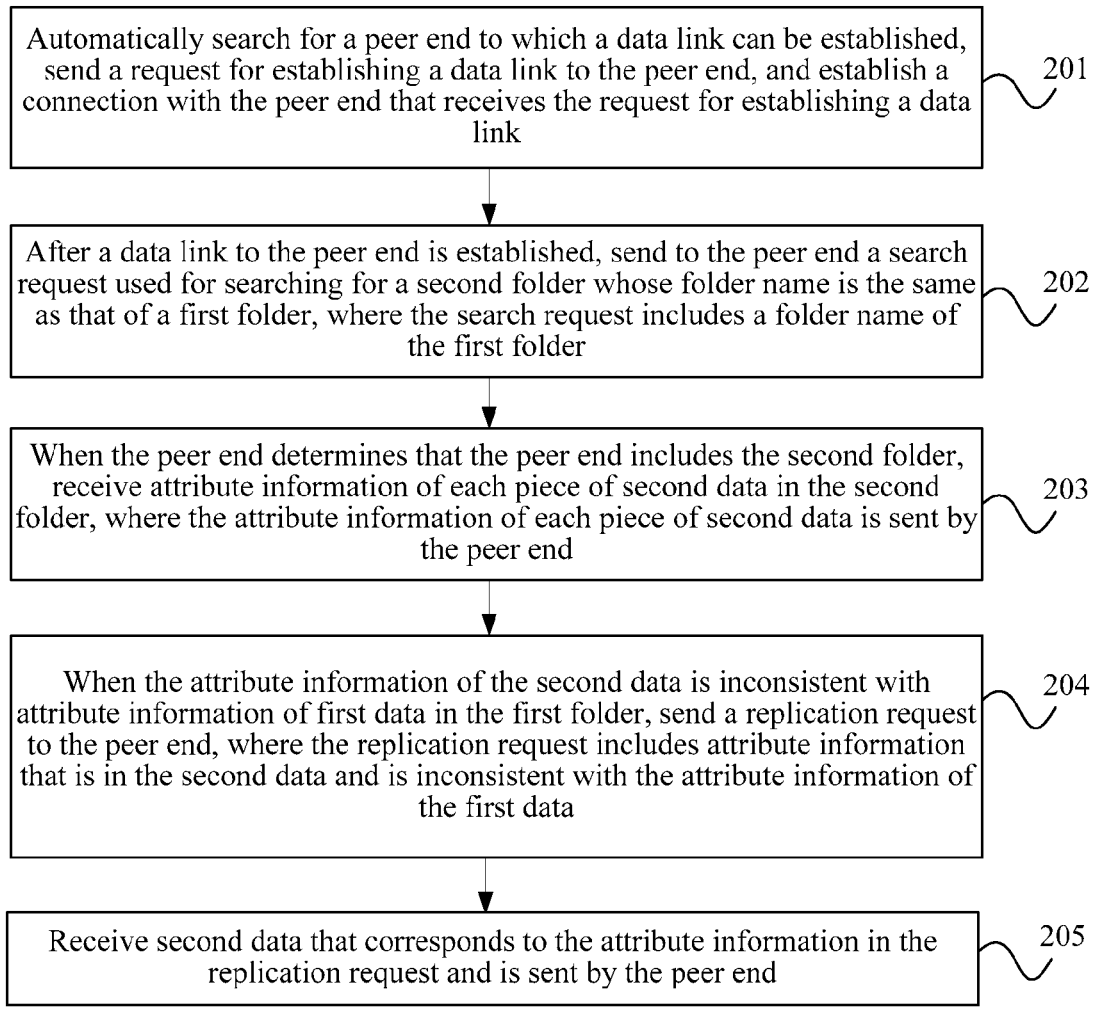
FIG. 2 is a schematic flow chart of a method for automatic data replication according to another embodiment of the present invention.

FIG. 2 is a schematic flow chart of a method for automatic data replication according to another embodiment of the present invention. As shown in FIG. 2, the method for automatic data replication in this embodiment is described as follows.

201. Automatically search for a peer end to which a data link can be established, send a request for establishing a data link to the peer end, and establish a connection with the peer end that receives the request for establishing a data link.

For example, a local end may be disposed with a WLAN connection module, an automatic Bluetooth connection module, a WIFI module, an infrared module, and so on, and the local end may automatically search, through a global search manner/limited search manner of the WLAN connection module, for a peer end to which a data link can be established. Correspondingly, the peer end may also be disposed with a WLAN connection module, an automatic Bluetooth connection module, a WIFI module, an infrared module, and so on, whose search functions are consistent with those of the WLAN connection module, the automatic Bluetooth connection module, the WIFI module, and the infrared module that are disposed on the local end.

202. After a data link to the peer end is established, send to the peer end a search request used for searching for a second folder whose folder name is the same as that of a first folder, where the search request includes a folder name of the first folder.

203. When the peer end determines that the peer end includes the second folder, receive attribute information of each piece of second data in the second folder, where the attribute information of each piece of second data is sent by the peer end.

204. When the attribute information of the second data is inconsistent with attribute information of first data in the first folder, send a replication request to the peer end, where the replication request includes attribute information that is in the second data and is inconsistent with the attribute information of the first data.

205. Receive second data that corresponds to the attribute information in the replication request and is sent by the peer end.

In a practical application, when the first folder and the second folder include multiple subfolders (as shown in FIG. 1A), a user may preset a replication sequence of subfiles. For example, music data in a music folder in the second folder is replicated first, and when the replication of the music folder is completed, video data in a video folder is then replicated. Next, document data in a document folder is replicated. Finally, it is checked whether the second folder further includes other data that has not been replicated yet, thereby implementing replication of any data in the second folder.

For example, in this embodiment, attribute information of any piece of data in each folder is recorded in its data list. For example, the data attribute of the first data may be recorded in a first data list, and the first data list is located in the first folder; and the attribute information of the second data may be recorded in a second data list, and the second data list is located in the second folder.

At this time, the attribute information of the second data further includes a replication permission level, and in step 203: When the peer end determines that the local end includes the second folder, receive a second data list that includes the attribute information of each piece of second data in the second folder and is sent by the peer end.

Correspondingly, in step 204, the replication request sent to the peer end includes: the attribute information that is in the second data and is inconsistent with the attribute information of the first data, and a preset key that corresponds to the replication permission level.

Further, in step 205, when determining that the key is correct, the peer end receives the second data that corresponds to the attribute information in the replication request and is sent by the peer end.

For example, the key may be various types of content that can be protected through encryption, such as a username, a simple password, a complex password, an encryption method, and a check code.

The replication permission level may include: no-check permission, level-1 check permission, and level-2 check permission.

When it is determined that the replication permission level of the second data is no-check permission by checking the second data list, after receiving the replication request, the peer end may directly send the second data to the local end.

When it is determined that the replication permission level of the second data is level-1 check permission by checking the second data list, the peer end receives the replication request that includes a check code, first checks whether the check code is correct, and if the check code is correct, sends to the local end second data that is replicated in advance.

When it is determined that the replication permission level of the second data is level-2 check permission by checking the second data list, a replication request is sent to the peer end, and at the same time, an encrypted username and an encryption method are sent to the peer end according to a transfer encryption protocol, so as to enable the peer end to decrypt the encrypted username according to the encryption method, and check whether a decrypted username is the same as the username transferred by the local end, and if the decrypted username is the same as the username transferred by the local end, send to the local end second data that is replicated in advance.

Definitely, when the peer end checks that the check code/username is incorrect, the peer end ends a replication process and sends prompt information that the key is incorrect.

Further, in other embodiments, modification time of the first data in the first data list may further be checked regularly, and when the modification time satisfies a preset condition (such as one week or one month), first data corresponding to the modification time is deleted, so as to enable the local end to release more space.

It should be noted that, during the deletion of the first data, it is usually checked that a storage space is insufficient when new data needs to be replicated, so that the modification time of the first data in the first data list is checked.

In a practical application, according to the size of a preset storage space, the first data may be periodically backed up to the storage space, and the storage space may be a hard disk, a desktop computer, or a cloud storage space.

In other embodiments, the method for automatic data replication further includes steps such as receiving a replication permission level of the first data in the first folder, where the replication permission level of the first data is configured by a user, a key that corresponds to the replication permission level, a displaying manner of attribute information in the first data list, or content included in the attribute information in the first data list. Further, the method for automatic data replication further includes a step of recording attribute information of replicated second data in the first data list.

It can be seen from the foregoing embodiment that, with the method for automatic data replication in this embodiment, after a data link to a peer end is established, a search request is sent to the peer end, and then when finding a second folder in the peer end according to the search request, the peer end sends to a local end attribute information of second data in the second folder, so that when it is determined that attribute information of first data in a first folder is inconsistent with the attribute information of the second data, the local end sends a replication request that is for replication and includes attribute information that is in the second data and is inconsistent with the attribute information of the first data, thereby implementing automatic data replication between two or more terminals, greatly saving data replication time for a user, and at the same time, providing convenience for the user.

Figure 3:
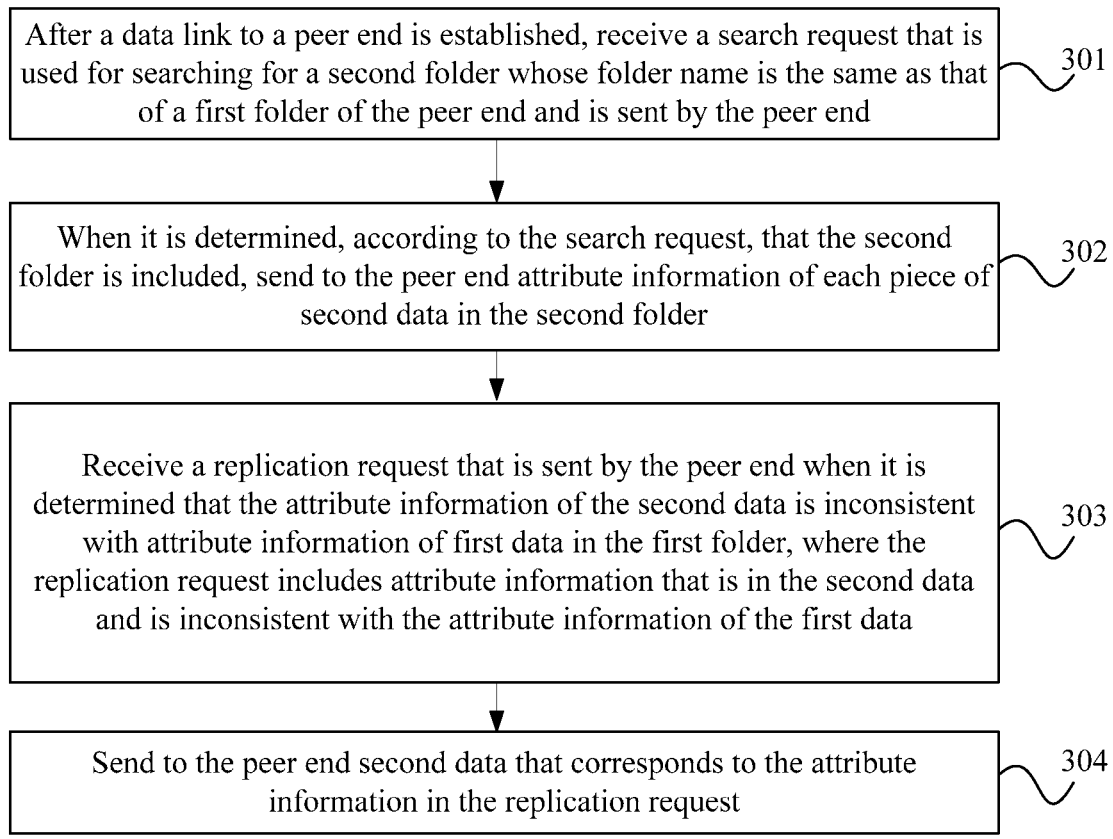
FIG. 3 is a schematic flow chart of a method for automatic data replication according to another embodiment of the present invention.

FIG. 3 is a schematic flow chart of a method for automatic data replication according to an embodiment of the present invention. As shown in FIG. 3, the method for automatic data replication in this embodiment is described as follows.

301. After a data link to a peer end is established, receive a search request that is used for searching for a second folder whose folder name is the same as that of a first folder of the peer end and is sent by the peer end.

In this step, the search request includes a folder name of the first folder.

302. When it is determined, according to the search request, that the second folder is included, send to the peer end attribute information of each piece of second data in the second folder.

303. Receive a replication request that is sent by the peer end when it is determined that the attribute information of the second data is inconsistent with attribute information of first data in the first folder, where the replication request includes attribute information that is in the second data and is inconsistent with the attribute information of the first data.

Generally, attribute information of each piece of first data in the first folder is recorded in a first data list; and the attribute information of each piece of second data in the second folder is recorded in a second data list. The first data list and the second data list may not be replicated, and attribute information recorded in the first data list and the second data list is updated automatically with a change of data in their respective folders.

Correspondingly, in step 302, a second data list that includes the attribute information of the second data is sent to the peer end.

For example, in step 303, determining that the attribute information of the second data is inconsistent with attribute information of first data in the first folder may be:

determining that any one item of the following: the name, size, modification time, and attribute of the second data is inconsistent with a corresponding item of the following: the name, size, modification time, and attribute of the first data in the first folder.

304. Send to the peer end second data that corresponds to the attribute information in the replication request.

In a practical application, the attribute information of the second data may further include a replication permission level, and at this time, in step 303, the received replication request sent by the peer end further includes a preset key that corresponds to the replication permission level and is in the peer end.

Further, in step 304, after it is determined that the key is correct, the second data that corresponds to the attribute information in the replication request is sent to the peer end; and otherwise, prompt information that the key is incorrect is sent to the peer end.

Definitely, if the attribute information of the second data includes a replication permission level, and the replication permission level is a level that requires a key, and at this time, the replication request sent by the peer end does not include a key, and the peer end receives prompt information of no replication permission.

It can be seen from the foregoing embodiment that, with the method for automatic data replication in this embodiment, automatic data replication is performed between a local end and a peer end between which a data link is established, thereby greatly saving data replication time for a user, and at the same time, providing convenience for the user.

Figure 4:
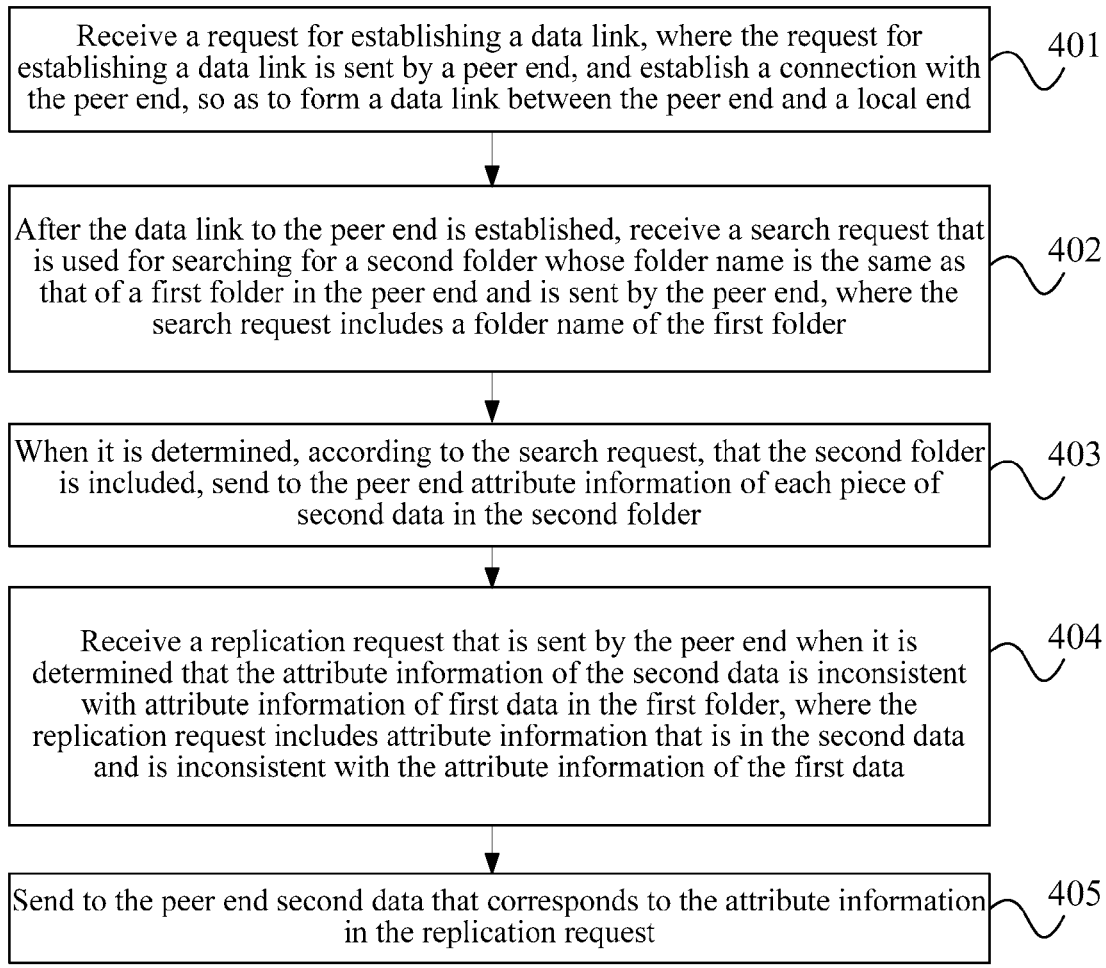
FIG. 4 is a schematic flow chart of a method for automatic data replication according to another embodiment of the present invention.

FIG. 4 is a schematic flow chart of a method for automatic data replication according to an embodiment of the present invention. As shown in FIG. 4, the method for automatic data replication in this embodiment is described as follows.

401. Receive a request for establishing a data link, where the request for establishing a data link is sent by a peer end, and establish a connection with the peer end, so as to form a data link between the peer end and a local end.

402. After the data link to the peer end is established, receive a search request that is used for searching for a second folder whose folder name is the same as that of a first folder in the peer end and is sent by the peer end, where the search request includes a folder name of the first folder.

403. When it is determined, according to the search request, that the second folder is included, send to the peer end attribute information of each piece of second data in the second folder.

404. Receive a replication request that is sent by the peer end when it is determined that the attribute information of the second data is inconsistent with attribute information of first data in the first folder, where the replication request includes attribute information that is in the second data and is inconsistent with the attribute information of the first data.

405. Send to the peer end second data that corresponds to the attribute information in the replication request.

In addition, in an actual process of mutual replication of the local end and the peer end, a storage space in the local end or the peer end might be insufficient, and at this time, the local end or the peer end needs to check modification time in attribute information of their respective data, so as to delete data whose modification time is beyond a preset condition. For example, modification time of each piece of second data in a second data list is checked regularly, and when the modification time satisfies a preset condition, second data corresponding to the modification time that satisfies the preset condition is deleted.

Definitely, to avoid a loss of second data in the local end, the local end may back up, according to the size of a preset storage space, the second data to the storage space periodically.

In a practical application, a replication process of the peer end and the local end may be a bidirectional replication process. In other embodiments, a user may set pre-shared data in the second folder in the local end, so as to share data in the second folder according to a demand.

It can be seen from the foregoing embodiment that, with the method for automatic data replication in this embodiment, automatic data replication is performed between a local end and a peer end between which a data link is established, thereby greatly saving data replication time for a user, and at the same time, providing convenience for the user.

Figure 5:
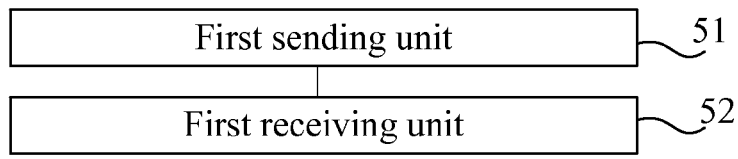
FIG. 5 is a schematic structural diagram of a terminal according to another embodiment of the present invention.

FIG. 5 is a schematic structural diagram of a terminal according to an embodiment of the present invention. As shown in FIG. 5, the terminal in this embodiment includes: a first sending unit 51 and a first receiving unit 52. The first sending unit 51 is configured to, after a data link to another terminal is established, send to the another terminal a search request used for searching for a second folder whose folder name is the same as that of a first folder, where the search request includes a folder name of the first folder. The first receiving unit 52 is configured to, when the another terminal determines that the another terminal includes the second folder, receive attribute information of each piece of second data in the second folder, where the attribute information of each piece of second data is sent by the another terminal.

The first sending unit 51 is further configured to, when the attribute information of the second data is inconsistent with attribute information of first data in the first folder, send a replication request to the another terminal, where the replication request includes attribute information that is in the second data and is inconsistent with the attribute information of the first data. The first receiving unit 52 is further configured to receive second data that corresponds to the attribute information in the replication request and is sent by the another terminal.

Particularly, the terminal in this embodiment further includes a data link establishing unit. The data link establishing unit is configured to automatically search for another terminal to which a data link can be established, and send to the another terminal a request for establishing a data link, and establish a connection with the another terminal that receives the request for establishing a data link.

The attribute information of the first data includes: the name, size, modification time, or attribute of the first data; and the attribute information of the second data includes: the name, size, modification time, or attribute of the second data.

Definitely, when it is determined that the attribute information of the first data is completely identical to the attribute information of the second data, the terminal and the another terminal do not perform replication from each other.

In addition, the attribute information of the second data further includes a replication permission level, the replication request that is sent to the another terminal by the first sending unit 51 further includes a preset key that corresponds to the replication permission level.

Correspondingly, the first receiving unit 52 is specifically configured to, when the another terminal determines that the key is correct, receive the second data that corresponds to the attribute information in the replication request and is sent by another terminal.

In a practical application, the terminal further includes: a first deletion unit and/or a first storage unit. The first deletion unit is configured to, when modification time of each piece of first data in a first data list satisfies a preset condition, delete first data that corresponds to the modification time that satisfies the preset condition. The first storage unit is configured to, according to the size of a preset storage space, back up the first data to the storage space periodically.

The terminal in this embodiment and another terminal to which a data link is established may replicate respective different data from each other to implement automatic data replication, so that a user does not need to spend data replication time, a function of the terminal becomes diversified, and experience is enhanced.

Definitely, the terminal may further include a configuration unit, configured to configure a replication permission level of data in the terminal, and meanwhile, may further configure information such as a preset key for replication from the another terminal, so that data in each terminal can be protected. That is to say, in other embodiments, if data in a terminal of a user is not shared with other users, and at this time, a replication permission level may be set for the data in the terminal by a configuration unit, so that another terminal needs to provide a key to replicate the data in the terminal. If the key is incorrect, the another terminal cannot replicate the data in the terminal, thereby desirably protecting data of the user, and enhancing data replication security.

Figure 6:
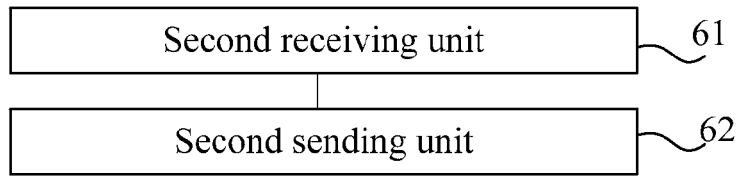
FIG. 6 is a schematic structural diagram of a terminal according to another embodiment of the present invention.

FIG. 6 is a schematic structural diagram of a terminal according to an embodiment of the present invention. As shown in FIG. 6, the terminal in this embodiment includes: a second receiving unit 61 and a second sending unit 62. The second receiving unit 61 is configured to, after a data link to another terminal is established, receive a search request that is used for searching for a second folder whose folder name is the same as that of a first folder of the another terminal and is sent by the another terminal, where the search request includes a folder name of the first folder. The second sending unit 62 sends to the another terminal attribute information of each piece of second data in the second folder when it is determined, according to the search request, that the second folder is included.

The second receiving unit 61 is further configured to receive a replication request that is sent by the another terminal when it is determined that the attribute information of the second data is inconsistent with attribute information of first data in the first folder, where the replication request includes attribute information that is in the second data and is inconsistent with the attribute information of the first data. The second sending unit 62 is further configured to send to the another terminal second data that corresponds to the attribute information in the replication request.

The attribute information of the first data includes: the name, size, modification time, or attribute of the first data; and the attribute information of the second data includes: the name, size, modification time, or attribute of the second data.

Particularly, the terminal further includes a second data link establishing unit. The second data link establishing unit is configured to receive a request for establishing a data link, where the request for establishing a data link is sent by another terminal, and establish a connection with the another terminal.

In addition, when the attribute information of the second data further includes a replication permission level, the replication request that is received by the second receiving unit 61 and is sent by the another terminal further includes a preset key that corresponds to the replication permission level and is in the another terminal.

Correspondingly, the terminal may further include a determining unit, configured to determine whether the key in the replication request is correct, and after the determining unit determines that the key is correct, the second sending unit sends the second data to the another terminal.

In a practical application, the terminal further includes a second deletion unit and/or a second storage unit. The second deletion unit is configured to, when modification time of each piece of second data in a second data list satisfies a preset condition, delete second data that corresponds to the modification time that satisfies the preset condition. The second storage unit is configured to, according to the size of a preset storage space, back up the second data to the storage space periodically.

The terminal in this embodiment and another terminal to which a data link is established may replicate respective different data from each other to implement automatic data replication, so that a user does not need to spend data replication time, a function of the terminal becomes diversified, and experience is enhanced.

Definitely, the terminal may further include a configuration unit, configured to configure a replication permission level for data in the terminal, and meanwhile, may further configure information such as a preset key for replication from the another terminal, so that data in each terminal can be protected. That is to say, in other embodiments, if data in a terminal of a user is not shared with other users, and at this time, a replication permission level may be set for the data in the terminal by a configuration unit, so that another terminal needs to provide a key to replicate the data in the terminal. If the key is incorrect, the another terminal cannot replicate the data in the terminal, thereby desirably protecting data of the user and enhancing data replication security.

In addition, in other embodiments, the terminal shown in FIG. 5 and FIG. 6 may further include units such as a CPU, a communication interface, a keyboard, and a mouse, which are not shown in the figures. The communication interface may include a WiFi communication interface, a Bluetooth communication interface, an Ethernet communication interface, and so on. Definitely, the terminal may further include a multimedia sharing unit, a data file managing unit, a gaming unit, a peripheral device managing unit, and so on.

Particularly, if the terminal has a touchscreen, a process of automatic data replication in the terminal is not displayed in a touch interface and background data replication is directly performed. When a user needs to edit the data that requires automatic replication, the user may open the data in an application program, so that the data is displayed in the interface.

Definitely, in practical use, if a space of a first folder is insufficient, a user is prompted that the space is insufficient, and at the same time, the user may further be prompted to select first deletable data located in the first folder.

In the embodiments provided in this application, it should be understood that the disclosed system, apparatus, and method may be implemented in other manners. For example, the foregoing described apparatus embodiments are merely exemplary.

The units described as separate parts may or may not be physically separate, and parts displayed as units may or may not be physical units, may be located in one position, or may be distributed on multiple network elements. A part or all of the units may be selected according to an actual requirement to achieve the objectives of the solutions in the embodiments.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as a separate product, the integrated unit may be stored in a computer-readable storage medium. Based on such understanding, the technical solutions in the present invention essentially, or the part contributing to the prior art, or all or a part of the technical solutions may be embodied in the form of a software product. The computer software product is stored in a storage medium and includes several instructions used for instructing a computer device (which may be a personal computer, a server, or a network device, and so on) to execute all or a part of steps of the methods described in the embodiments of the present invention. The storage medium includes: any medium that can store program codes, such as a USB flash disk, a removable hard disk, a read-only memory (ROM), a random access memory (RAM), a magnetic disk, or an optical disk.

Finally, it should be noted that the foregoing embodiments are merely used for describing the technical solutions in the present invention, but are not intended to limit the present invention. Although the present invention is described in detail with reference to the foregoing embodiments, persons of ordinary skill in the art should understand that they may still make modifications to the technical solutions described in the foregoing embodiments or make equivalent substitutions to some technical features of the technical solutions, as long as these modifications or substitutions do not cause corresponding technical solutions to depart from the spirit and scope of the technical solutions in the embodiments of the present invention.

What is claimed is:

1. A method for automatic data replication between terminals, comprising:
   automatically searching, by a terminal, for a peer end to which a data link is capable of being established;
   sending a request for establishing the data link to the peer end;
   establishing the data link with the peer end that receives the request for establishing the data link;

sending, by the terminal to the peer end after the data link to the peer end is established, a search request used for searching for a second folder having a folder name that is the same as a folder name of a first folder, wherein the search request comprises the folder name of the first folder, and wherein the first folder is located in the terminal;

receiving, by the terminal from the peer end after the peer end determines that the peer end comprises the second folder, attribute information of each piece of second data in the second folder rather than a replica of each piece of the second data in the second folder;

in response to receiving the attribute information of the second data, determining, by the terminal, whether the attribute information of the second data is inconsistent with attribute information of first data in the first folder;

sending, by the terminal to the peer end when the attribute information of the second data is inconsistent with the attribute information of first data in the first folder, a replication request, wherein the replication request comprises attribute information that is in the second data and is inconsistent with the attribute information of the first data; and receiving, by the terminal, a replica of the second data that corresponds to the attribute information in the replication request sent by the peer end;

wherein when the attribute information of the second data further comprises a replication permission level and when it is determined that the replication permission level of the second data is a level-1 check permission by checking the second data list, the peer end receives the replication request that includes a check code, firstly checks whether the check code is correct, and when the check code is correct, sends to the terminal second data that is replicated in advance.

2. The method according to claim 1, wherein the attribute information of the second data which is inconsistent with the attribute information of the first data in the first folder comprises one or more of the group consisting of: a name of the second data that is inconsistent with a corresponding name of the first data, a size of the second data that is inconsistent with a corresponding size of the first data, a modification time of the second data that is inconsistent with a corresponding modification time of the first data, and an attribute of the second data which is inconsistent with a corresponding attribute of the first data.

3. The method according to claim 1, further comprising:
checking a modification time of the first data; and
deleting the first data that corresponds to the modification time when the modification time satisfies a preset condition.

4. The method according to claim 1, further comprising:
backing up the first data to a storage space periodically.

5. The method according to claim 1, wherein
when it is determined that the replication permission level of the second data is a no-check permission, after receiving the replication request, the peer end directly sends the second data to the terminal.

6. The method according to claim 1, wherein
when it is determined that the replication permission level of the second data is a level-2 check permission, a replication request is sent to the peer end, and at the same time, an encrypted username and an encryption method are sent to the peer end according to a transfer encryption protocol, so as to enable the peer end to decrypt the encrypted username according to the encryption method, and check whether a decrypted username is the same as the username transferred by the terminal, and when the decrypted username is the same as the username transferred by the terminal, send to the terminal second data that is replicated in advance.

7. A method for automatic data replication between terminals, comprising:
receiving, by a terminal, a request for establishing a data link, wherein the request for establishing the data link is sent by a peer end;
establishing the data link with the peer end;
receiving, by the terminal from the peer end after the data link is to the peer end is established, a search request that is used for searching for a second folder having a folder name that is the same as a folder name of a first folder located at the peer end, wherein the search request comprises the folder name of the first folder, and wherein the first folder is located in the peer end;
sending, by the terminal to the peer end when it is determined, according to the search request, that the second folder is located at the peer end, attribute information of each piece of second data in the second folder rather than a replica of each piece of the second data in the second folder;
receiving, by the terminal from the peer end when the peer end determines, in response to obtaining the attribute information of the second data, that the attribute information of the second data is inconsistent with attribute information of the first data, a replication request, wherein the replication request comprises attribute information that is in the second data and is inconsistent with the attribute information of the first data; and
sending, by the terminal to the peer end, a replica of the second data that corresponds to the attribute information in the replication request;
wherein when the attribute information of the second data further comprises a replication permission level:
the received replication request sent by the peer end further comprises a preset key that corresponds to the replication permission level and is in the peer end; and
after it is determined that the preset key is correct, the second data that corresponds to the attribute information in the replication request is sent to the peer end.

8. The method according to claim 7, wherein determining that the attribute information of the second data is inconsistent with the attribute information of the first data by the peer end comprises:
determining one or more of the group consisting of: the name of the second data is inconsistent with a corresponding name of the first data, a size of the second data is inconsistent with a corresponding size of the second data, a modification time of the second data is inconsistent with a corresponding modification size of the first data, and an attribute of the second data is inconsistent with a corresponding attribute of the first data.

9. The method according to claim 7, further comprising:
checking a modification time of the second data; and
deleting the second data that corresponds to the modification time when the modification time satisfies a preset condition.

10. The method according to claim 7, further comprising:
backing up the second data to a storage space.

11. A terminal, comprising a non-transitory computer readable medium and a computer processor, wherein the non-transitory computer readable medium comprises computer program code, which when executed by the computer processor, causes the computer processor to execute the following steps:

searching, by the terminal, for a second terminal to which a data link is capable of being established;

sending a request for establishing the data link to the second terminal;

establishing the data link with the second terminal that receives the request for establishing the data link;

sending to the second terminal after the data link to the second terminal is established, a search request used for searching for a second folder having a folder name that is the same as a folder name of a first folder, wherein the search request comprises the folder name of the first folder, and wherein the first folder is located in the terminal;

receiving, from the second terminal when the second terminal determines that the second terminal comprises the second folder, attribute information of each piece of second data in the second folder rather than a replica of each piece of the second data in the second folder;

determining, in response to obtaining the attribute information of the second data, whether the attribute information of the second data is inconsistent with attribute information of first data in the first folder;

sending, to the second terminal when the attribute information of the second data is inconsistent with the attribute information of first data in the first folder, a replication request, wherein the replication request comprises attribute information that is in the second data and is inconsistent with the attribute information of the first data; and receiving a replica of the second data that corresponds to the attribute information in the replication request sent by the second terminal;

wherein when the attribute information of the second data further comprises a replication permission level:

the replication request that is sent to the second terminal by the terminal further comprises a preset key that corresponds to the replication permission level; and correspondingly, when the second terminal determines that the preset key is correct, the computer processor receives the second data that corresponds to the attribute information in the replication request and is sent by the second terminal.

12. The terminal according to claim 11, wherein the computer processor also executes the steps of:

deleting the first data when a modification time of the first data satisfies a preset condition; and backing up the first data to a storage space.

13. A terminal, comprising a non-transitory computer readable medium and a computer processor, wherein the non-transitory computer readable medium comprises computer executable code, which when executed by the computer processor, causes the computer processor to execute the following steps:

receiving a request for establishing a data link, wherein the request for establishing the data link is sent by a second terminal;

establishing the data link with the second terminal;

receiving, from the second terminal, a search request that is used for searching for a second folder whose folder name is the same as a folder name of a first folder of the second terminal, wherein the search request comprises the folder name of the first folder, and wherein the first folder is located in the second terminal;

sending, to the second terminal if the second folder is identified, attribute information of each piece of second data in the second folder rather than a replica of each piece of the second data in the second folder;

receiving, from the second terminal when the second terminal determines, in response to obtaining the attribute information of the second data, that the attribute information of the second data is inconsistent with attribute information of the first data, a replication request, wherein the replication request comprises the attribute information that is in the second data and is inconsistent with the attribute information of the first data; and sending to the second terminal a replica of the second data that corresponds to the attribute information in the replication request;

wherein when the attribute information of the second data further comprises a replication permission level:

the received replication request that is received by the terminal and is sent by the second terminal further comprises a preset key that corresponds to the replication permission level and is in the second terminal;

correspondingly, the computer processor further executes the following:

determining whether the preset key is correct; and after determining that the preset key is correct, sending the second data to the second terminal.

14. The terminal according to claim 13, wherein the computer processor further executes the steps of:

deleting the second data that corresponds to a modification time when the modification time satisfies a preset condition; and backing up the second data to a storage space.

\* \* \* \* \*